United States Patent Office 3,739,000
Patented June 12, 1973

3,739,000
PROCESS FOR PREPARING AMINOTRIPHENYL-METHANE LEUCO BASES
Marcello Lodolini, Rochester, and Cataldo A. Maggiulli, Pittsford, N.Y., assignors to Eastman Kodak Company, Rochester, N.Y.
No Drawing. Filed Sept. 25, 1970, Ser. No. 75,760
Int. Cl. C09b *11/14*
U.S. Cl. 260—391                                18 Claims

ABSTRACT OF THE DISCLOSURE

Amino-triphenylmethane leuco bases are prepared by reacting benzaldehyde or a ring-substituted benzaldehyde with an N,N-dialkylaniline in the presence of a catalytically effective amount of an organic sulfonic acid. The reaction is advantageously carried out by employing a polar solvent which forms an azeotrope with water and continuously removing the water produced in the reaction by azeotropic distillation.

---

This invention relates to the preparation of amino-triphenylmethane leuco bases by reaction of benzaldehyde or a ring-substituted benzaldehyde with an N,N-dialkylaniline compound. More particularly, this invention relates to the use of organic sulfonic acids to catalyze the aforesaid reaction.

Amino-triphenylmethane leuco bases are a well known class of compounds having utility in various applications. They are used, for example, to prepare triphenylmethane dyes, as color formers in photographic processes, and as photoconductors in electrophotography. It is known to prepare aminotriphenylmethane leuco bases by condensing benzaldehyde or a ring-substituted benzaldehyde with an N,N-dialkylaniline compound. A condensing agent is used to promote the reaction, examples of useful condensing agents for this purpose being zinc chloride, hydrochloric acid and sulfuric acid. While these agents are effective in providing high yields, relatively long reaction times are required and recovery and purification of the product are difficult and expensive.

It has now been discovered that organic sulfonic acids will function to catalyze the reaction of benzaldehyde or a ring-substituted benzaldehyde with an N,N-dialkylaniline compound to form an amino-triphenylmethane leuco base. Whereas the condensing agents employed heretofore have been used in amounts which are equivalent on a molar basis to the amount of the benzaldehyde compound, only catalytic amounts of the organic sulfonic acid are required. Moreover, substantially decreased reaction times are achieved and the recovery and purification of the product are simplified by effecting the reaction in the presence of a catalytic amount of the organic sulfonic acid.

The method of this invention can be represented by the following reaction equation:

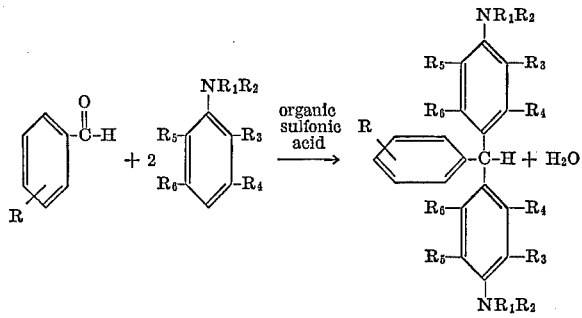

where $R_1$ and $R_2$ are alkyl groups such as methyl, ethyl, propyl, butyl, and the like, and R, $R_3$, $R_4$, $R_5$ and $R_6$ are hydrogen atoms or functional groups such as hydroxy, halo, nitro, cyano, sulfo, alkoxy, carboxy, alkyl, acyl, acylamido, acyloxy, and the like. While applicants do not wish to be bound by any theoretical explanation of the manner in which their invention functions, it is believed that the sole function of the sulfonic acid is that of protonating the aldehyde to form a carbonium ion which reacts with the activated carbon atom para to the amino group of the N,N-dialkylaniline compound and that any organic sulfonic acid capable of furnishing a proton to initiate the reaction can be utilized.

The benzaldehyde compounds of utility in the process of this invention include benzaldehyde itself and ring-substituted benzaldehydes such as p-acetamidobenzaldehyde, o-benzaldehyde-sulfonic acid sodium salt, o-chlorobenzaldehyde, p-chlorobenzaldehyde, p-cyanobenzaldehyde, 2,4-dichlorobenzaldehyde, 2,4-dihydroxybenzaldehyde, 2,5-dihydroxybenzaldehyde, 2,5-dimethoxybenzaldehyde, 3,4-dimethoxybenzaldehyde, o-ethoxybenzaldehyde, 3 - ethoxy - 4 - hydroxybenzaldehyde, p-hydroxybenzaldehyde, 4 - hydroxybenzaldehyde-3-sulfonic acid sodium salt, o-methoxybenzaldehyde, 4-methoxybenzaldehyde-3-sulfonic acid sodium salt, m-nitrobenzaldehyde, p-nitrobenzaldehyde, p-isopropylbenzaldehyde, and the like.

In accordance with this invention, the benzaldehyde compound can be reacted with any N,N-dialkylaniline having an active ring hydrogen atom para to the amino group. Examples of such compounds include N,N-dimethylaniline, N,N-diethylaniline, N,N-dipropylaniline, N,N-dibutylaniline, N,N-dimethyl-o-nitroaniline, N,N-dimethyl-m-nitroaniline, N,N-diethyl-o-toluidine, N,N-diethyl-m-toluidine, N-ethyl-N-methylaniline, N,N-diethyl-2,5-dimethylaniline, N,N,3,5-tetramethylaniline, 2-methoxy-N,N-dimethylaniline, 2 - chloro - N,N - dimethylaniline, m-dimethylaminophenol, m-diethylaminophenol, and the like.

Typical examples of the preparation of amino-triphenylmethane leuco bases by the process of this invention include the following:

(1) Reaction of benzaldehyde with N,N-dimethylaniline to produce bis(4,4'-dimethylaminophenyl)phenyl methane in accordance with the following equation:

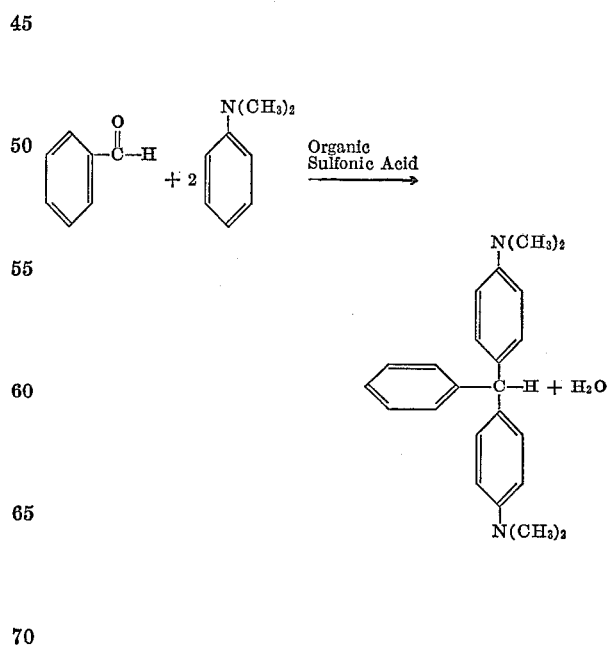

(2) Reaction of 2,4-dichlorobenzaldehyde with N,N-dimethylaniline to produce bis(4,4'-dimethylaminophenyl)-2'',4''-dichlorophenyl methane in accordance with the following equation:

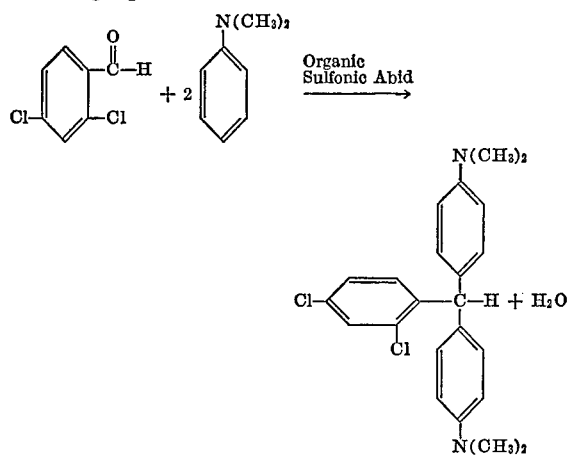

(3) Reaction of m-nitrobenzaldehyde with N,N-diethylaniline to produce bis(4,4'-diethylaminophenyl)-3''-nitrophenyl methane in accordance with the following equation:

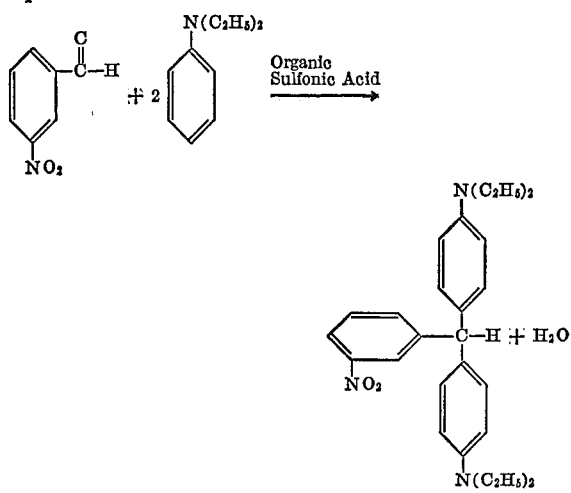

(4) Reaction of p-acetamidobenzaldehyde with N,N-dimethylaniline to produce 4,4'-(p-acetamidobenzylidene)bis(N,N-dimethylaniline) in accordance with the following equation:

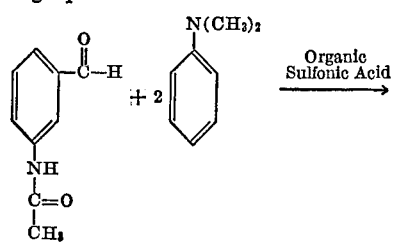

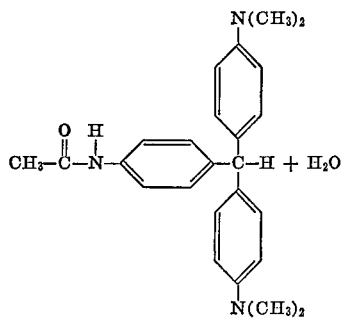

(5) Reaction of benzaldehyde with N,N-diethyl-m-toluidine to produce 4,4'-benzylidenebis(N,N-diethyl-m-toluidine) in accordance with the following equation:

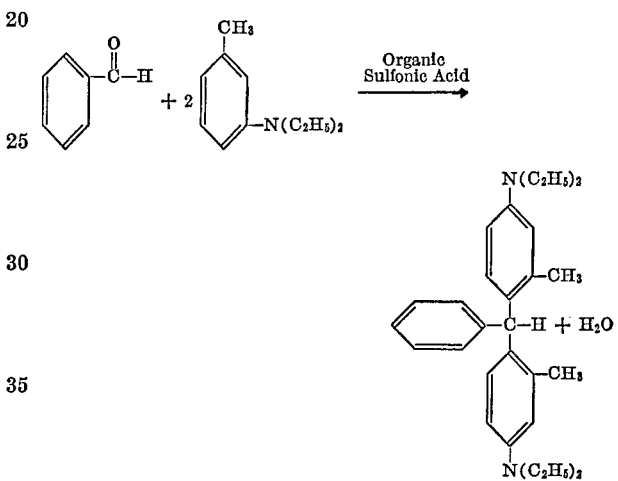

(6) Reaction of 4-methoxybenzaldehyde-3-sulfonic acid sodium salt with N,N-dimethylaniline to produce the sodium salt of α,α-bis(p-dimethylaminophenyl)-6-methoxy-m-toluenesulfonic acid in accordance with the following equation:

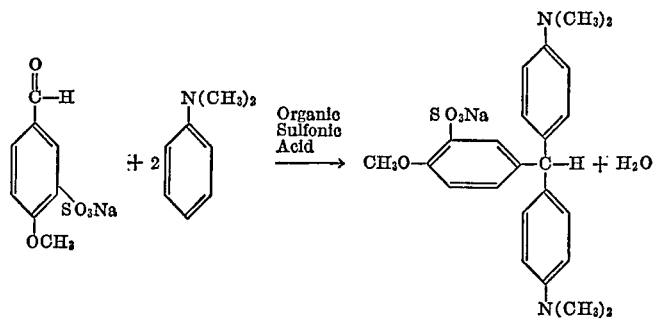

An organic sulfonic acid is employed in the process of this invention in a catalytic amount to furnish a proton to initiate the reaction. Either the aliphatic sulfonic acids or the aromatic sulfonic acids can be used and they can contain one or more sulfonic acid groups. Examples of suitable organic sulfonic acids for the purposes of this invention include methanesulfonic acid, ethanesulfonic acid, 1-propanesulfonic acid, 2-propanesulfonic acid, 1-butanesulfonic acid, 3-methyl-1-butanesulfonic acid, benzenesulfonic acid, 2,5-dimethylbenzenesulfonic acid, p-chlorobenzenesulfonic acid, m-benzenedisulfonic acid, p-toluenesulfonic acid, 1-naphthalenesulfonic acid, 2-naphthalenesulfonic acid, 2,7-naphthalenedisulfonic acid, and the like.

Reaction of the benzaldehyde compound with the N,N-dialkylaniline can be carried out over a broad range of temperatures and at pressures from sub-atmospheric to super-atomspheric, as desired. The reactants are advantageously employed in essentially stoichiometric proportions, i.e. two moles of the N,N-dialkylaniline for each mole of the benzaldehyde compound. Typically, the reaction is carried out by dissolving the reactants in a suitable solvent and refluxing in the presence of a catalytic amount of the organic sulfonic acid. Any amount of the sulfonic acid that is adequate to catalyze the reaction can be used, for example, amounts in the range from about 0.0001 to about 0.05 part per part by weight of the combined reactants. Suitable solvents for use in carrying out the reaction include alkanols such as isopropanol, n-butanol or n-pentanol, and aromatic hydrocarbons such as benzene, toluene or xylene. Optimum results are obtained by use of a polar solvent which forms an azeotrope with water, thereby permitting the water produced in the reaction to be continuously removed by azeotropic distillation so as to increase the reaction rate and drive the reaction to completion. Using this procedure, the reaction will ordinarily be completed in less than about twenty-four hours.

The invention is further illustrated by the following examples of its practice.

EXAMPLE 1

To a one-liter three-necked flask, equipped with a stirrer, thermometer, reflux condenser, and "ester head" (a device for removing the water formed in the reaction which is also referred to as a Dean-Stark trap), there was added 53 grams (0.5 mole) of benzaldehyde, 163 grams (1 mole) of N,N-diethyl-m-toluidine, 100 cc. of n-pentanol and 0.5 cc. of methanesulfonic acid. Heating at reflux (pot temperature of 150° C.) was continued for approximately 24 hours while collecting the azeotrope of water and n-pentanol. At the end of this period, the reaction mixture was poured into an equal volume of ethyl alcohol, and the solution was cooled with vigorous stirring to 10° C. The resulting slurry was filtered, washed with ethyl alcohol until the washings were colorless, and dried overnight in a 40° C. oven to give a yield of 155 grams of 4,4'-benzylidenebis(N,N - diethyl - m - toluidine) with a melting point of 110–112° C. The yield obtained was equal to 75 percent of the theoretical yield.

The use of n-pentanol as reaction solvent is especially advantageous in that it readily forms an azeotrope with water yet separates from the water in the reflux condenser, and further in view of the fact that it functions as an excellent crystallization solvent for the product.

The same reaction was carried out with reaction times of 9, 16, 40 and 72 hours, with yields of 55%, 74%, 73% and 73%, respectively; thus indicating that the maximum yield attainable is achieved in about 16 hours. Carrying out the same reaction with a 50 percent excess of benzaldehyde resulted in a yield of only 63% in 24 hours, the lower yield apparently being due to formation of a polymeric material.

In contrast with these results, preparation of 4,4'-benzylidenebis(N,N - dimethyl - m - toluidine) in accordance with the procedures of the prior art by reacting one equivalent of benzaldehyde with three equivalents of N,N-diethyl-m-toluidine in the presence of one equivalent of concentrated hydrochloric acid requires 72 hours at reflux for completion of the reaction. The reaction mixture must then be neutralized by addition of a base, steam distilled to remove the excess N,N-diethyl-m-toluidine, the water removed by decanting, and the resulting resinous mass crystallized in alcohol. The yield by this procedure is 90% of theoretical. While the yield using methanesulfonic acid as catalyst was only 75% of theoretical, the lower yield was more than compensated for by the reduced reaction time, the elimination of the neutralization and steam distillation steps, and the greater amenability of the product to rapid filtration.

EXAMPLE 2

To a one-liter three-necked flask, equipped with a stirrer, thermometer, reflux condenser, and "ester head" there was added 47.6 grams (0.2 mole) of 4-methoxybenzaldehyde-3-sulfonic acid sodium salt, 55 grams (0.45 mole) of N,N-dimethylaniline, 600 cc. of n-pentanol and 1 cc. of methanesulfonic acid. Heating at reflux (pot temperature of 130–140° C.) was continued for approximately 24 hours while collecting the azeotrope of water and n-pentanol. At the end of this time, the reaction mixture was cooled, filtered, washed thoroughly with acetone, and dried in a hot (50–60° C.) oven to give a yield of 82 grams of $\alpha,\alpha$-bis(p - dimethylaminophenyl) - 6 - methoxy-m-toluenesulfonic acid sodium salt. The yield obtained was equal to 89 percent of the theoretical yield.

In contrast with these results, preparation of $\alpha,\alpha$-bis(p-dimethylaminophenyl) - 6 - methoxy - m - toluenesulfonic acid sodium salt by reacting one equivalent of 4-methoxybenzaldehyde-3-sulfonic acid sodium salt with three equivalents of N,N-dimethylaniline in the presence of one equivalent of concentrated sulfuric acid requires a minimum of 96 hours at reflux for completion of the reaction, requires neutralization of the reaction mixture and steam distillation to remove the excess N,N-dimethylaniline, and results in the formation of a paste-like material which is very difficult to filter and dry. The yield obtained by this procedure is 70% of theoretical.

EXAMPLE 3

To a one-liter three-necked flask, equipped with a stirrer, thermometer, reflux condenser and "ester head," there was added 100 grams (0.615 mole) of p-acetamidobenzaldehyde, 160 grams (1.3 moles) of N,N-dimethylaniline, 500 cc. of n-pentanol and 2 grams of methanesulfonic acid. The mixture was heated to reflux and the theoretical amount of water was removed over a period of 1½ hours. The mixture was allowed to stand overnight (for convenience), the alcohol was removed by distillation, and the residue was steam distilled to remove excess dimethylaniline and solvent. After washing with water, the residue was dissolved in two liters of hot ethanol and then cooled to precipitate a light blue colored product. The product was collected by filtration, washed with cold ethanol, and dried under vacuum to give a yield of 160 grams of 4,4'-(p-acetamidobenzylidene)bis(N,N-dimethylaniline). The yield obtained was equal to 68 percent of the theoretical yield.

The invention has been described in detail with particular reference to preferred embodiments thereof, but it will be understood that variations and modifications can be effected within the spirit and scope of the invention.

We claim:

1. In a process for preparing an amino-triphenylmethane leuco base by reacting benzaldehyde or a ring-substituted benzaldehyde with an N,N-dialkylaniline, the improvement comprising effecting said reaction in the presence of a catalytically effective amount of an organic sulfonic acid.

2. The process as described in claim 1 wherein said reaction is carried out in a polar solvent that forms an azeotrope with water and the water produced in the reaction is continuously removed by azeotropic distillation.

3. The process as described in claim 1 wherein the reactants are employed in substantially stoichiometric proportions.

4. The process as described in claim 1 wherein said organic sulfonic acid is methanesulfonic acid.

5. The process as described in claim 1 wherein said organic sulfonic acid is benzenesulfonic acid.

6. The process as described in claim 1 wherein said organic sulfonic acid is p-toluenesulfonic acid.

7. A process for preparing 4,4'-benzylidenebis(N,N-diethyl-m-toluidine) which comprises reacting benzaldehyde with N,N-diethyl-m-toluidine in the presence of a catalytically effective amount of an organic sulfonic acid.

8. The process as described in claim 7 wherein said organic sulfonic acid is methanesulfonic acid.

9. The process as described in claim 7 wherein said reaction is carried out using a polar solvent which forms an azeotrope with water as reaction solvent and the azeotrope of said solvent and the water produced in the reaction is continuously removed from the reaction zone.

10. The process as described in claim 9 wherein said solvent is n-pentanol.

11. A process for preparing the sodium salt of $\alpha,\alpha$-bis-(p-dimethylaminophenyl)-6-methoxy-m-toluenesulfonic acid which comprises reacting 4-methoxybenzaldehyde-3-sulfonic acid sodium salt with N,N-dimethylaniline in the presence of a catalytically effective amount of an organic sulfonic acid.

12. The process as described in claim 11 wherein said organic sulfonic acid is methanesulfonic acid.

13. The process as described in claim 11 wherein said reaction is carried out using a polar solvent which forms an azeotrope with water as reaction solvent and the azeotrope of said solvent and the water produced in the reaction is continuously removed from the reaction zone.

14. The process as described in claim 13 wherein said solvent is n-pentanol.

15. A process for preparing 4,4'-(p-acetamidobenzylidene) bis (N,N-dimethylaniline) which comprises reacting p-acetamidobenzaldehyde with N,N-dimethylaniline in the presence of a catalytically effective amount of an organic sulfonic acid.

16. The process as described in claim 15 wherein said organic sulfonic acid is methanesulfonic acid.

17. The process as described in claim 15 wherein said reaction is carried out using a polar solvent forms an azeotrope with water as reaction solvent and the azeotrope of said solvent and the water produced in the reaction is continuously removed from the reaction zone.

18. The process as described in claim 17 wherein said solvent is n-pentanol.

References Cited
UNITED STATES PATENTS 1,588,052   6/1926   Reyher _____ 260—393

LORRAINE A. WEINBERGER, Primary Examiner

L. A. THAXTON, Assistant Examiner

U.S. Cl. X.R.

260—392, 393, 394